United States Patent [19]

Joe et al.

[11] Patent Number: 5,688,849

[45] Date of Patent: Nov. 18, 1997

[54] PHOTOLYZABLE POLYOLEFIN COMPOSITION

[75] Inventors: Sungsam Joe; Kwangho Lee, both of Seoul, Rep. of Korea; V. I. Nikolaichik, Moscow, Russian Federation; V. V. Abramov, Moscow, Russian Federation; E. P. Dontsova, Moscow, Russian Federation; A. M. Tchebotar, Moscow, Russian Federation; S. N. Degtiareva, Moscow, Russian Federation

[73] Assignee: STC Corporation, Seoul, Rep. of Korea

[21] Appl. No.: 538,813

[22] Filed: Oct. 3, 1995

[30] Foreign Application Priority Data

Oct. 8, 1994 [KR] Rep. of Korea ............... 94-25777

[51] Int. Cl.⁶ ............................................. C08K 5/24
[52] U.S. Cl. ...................... 524/262; 523/124; 523/125; 523/126
[58] Field of Search ........................... 523/124, 125, 523/126; 524/262

[56] References Cited

U.S. PATENT DOCUMENTS

| | | | |
|---|---|---|---|
| 3,865,767 | 2/1975 | Boberg | 260/23 H |
| 4,083,724 | 4/1978 | Muzyczko et al. | 95/115 R |
| 4,156,612 | 5/1979 | Muzyczko et al. | 95/115 R |

*Primary Examiner*—Edward J. Cain
*Attorney, Agent, or Firm*—Spencer & Frank

[57] ABSTRACT

A polyolefin composition which is photolyzable, includes polyolefin; and an effective amount of a photolytic agent which is an alkoxydimethylsilylferrocene having a general formula (I):

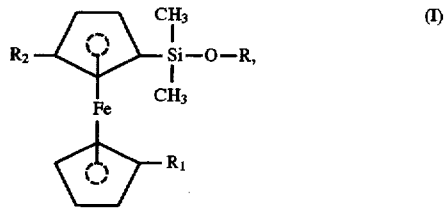

wherein R represents $C_nH_{2n+1}$ in which n ranges from 4 to 10, and $R_1$ and $R_2$ represent H or $SI(CH_3)_2OR$ and may be the same or different. The polyolefin is preferably selected from the group consisting essentially of a low density polyethylene, a high density polyethylene, a polypropylene, an ethylene-propylene copolymer, an ethylene-butene copolymer, an ethylene-hexene copolymer, an ethylene-octene copolymer, an ethylene-vinyl acetate copolymer, and mixtures thereof. The alkoxydimethylsilylferrocene is preferably present in an amount ranging from 0.001 weight % to 0.5 weight %, most preferably, in an amount ranging from 0.005 weight % to 0.2% weight %.

12 Claims, No Drawings

PHOTOLYZABLE POLYOLEFIN COMPOSITION

BACKGROUND OF THE INVENTION

This invention is directed to the composition comprised of a polyolefin which is decomposed by photolysis when exposed to sunlight for a certain time. In explaining more detail, it is directed to composition of photolyzable polyolefin in which polyolefin or a substance of polyolefin system containing alkoxydimethylsilylferrocene which is a photolytic agent, is decomposed after a certain time passes.

Polyolefin is widely used to make film, filament, blown type or injection products due to the various physical properties, chemical durability and cheap price. Their uses are wrapping container, stapling, coating material, agricultural film, etc. However, thrown away as a waste after being used, they cause the problem of environmental pollution.

In order to solve the problem of environmental pollution, various methods are considered. One of them is to add photolytic agent or photosensitizer to polyolefin or the kind of film of polyolefin system while containing the physical property as a conventional wrapping material, and then to decompose the kind of film of polyolefin system by sunlight or ultraviolet radiation.

The conditions for such a substance to be added to polyolefin were as follows:

1) Should not be harmful to the human body.

2) Should not be harmful to environment when decomposed.

3) Should not possibly affect physical, mechanical and the other properties of a wrapping material.

4) Should reuse an added material, if possible.

Such conventional photolytic accelerants include anthroquinone, phenol phthalein, benzophenone etc that the number of carbon is 4~8 as aromatic ketone system and are hexanone, oxanone, nodecanone etc that the number of carbon is 6~40 as an alicyclic ketone system, are benzoaldehyde etc that the number of carbon is 6~40 as an alicyclic aldehyde system or an aromatic aldehyde system, and in addition, they are heavy metal salts etc such as Fe, Co, Ni, Cu, Ce and Zn. Among these, the widely used substance for photolysis is the heavy metal organic substances dithiocarbamate and dithiophosphite which are the body forming organic compound.

However, these photolytic substances take a long time for decomposing in Eurasia, Central and Northern Europe and the Far Eastern area in which sunlight is weak. That is to say, there is a disadvantage that a decomposing time takes long because the period from the starting point of sunlight to the breaking point or the point of an extension ratio being equal 0 takes long.

On the other hand, in low density polyethylene, as a photolytic agent, a ferrocene substance, for example, alpha oxyferrocene, 2, 2-bis(1.1-diethylferrocenyl) propane (FEP-2), is using, which takes relatively short time of about 2 months for decomposition to occur even in the region where the intensity of ultraviolet radiation of the sun is weak as mentioned before.

FEP-2 can be used in other polyolefin systems as well as in low density polyethylene and also can be used in high density polyethylene, polypropylene, copolymer and terpolymer, and in addition, in the olefin of copolymers, such as ethylene-vinyl acetate.

However, by adding to polyolefin, FEP-2 increases pyrolysis as well as decomposition by light. For example, even if 0.02% of FEP-2 is added to polyprophylene, a regenerated resin of good quality can not be produced. This is because a foam is formed in the regenerated resin, color is changed by the decomposing substance and then physical changes occur. However, polypropylene to which FEP-2 is not added can produce a regenerated resin of good quality and it can be regenerated by recycling to the production of film. Moreover, in films manufactured using FEP-2, physical and mechanical strength decreases a little compared to products without additive(s), and the use of regenerated substance is not possible.

SUMMARY OF THE INVENTION

This invention was carried out in order to solve the above problems, and was to provide the composite which consists of adding a compound described in the following general formula (I) to polyolefin materials as a photolytic agent.

So constituted, a film of polyolefin or a other products are made photolyzable. Also, polyolefin-applied substance was prevented from being pyrolyzed, the film or the other products were to have normal physical and mechanical property during the decided certain time, and regenerated products produced in manufacturing were to be reused.

As polyolefin used in this invention, there are low density and high density polyethylene, polyprophylene, copolymer of prophylene and ethylene, ternary copolymer of butene, pentene, hexene, heptene, octene that are high-degree olefin with prophylene, ethylene, vinylacetate and their blends.

Also, the compound described as general formula(I) means alkoxydimethylsilylferrocene(AOSF) as an additive which makes polyolefin materials photolyzable and photosensitive.

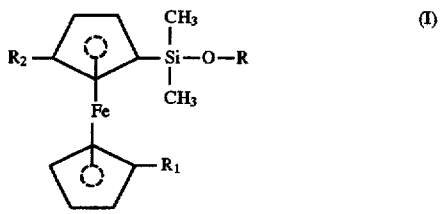

In the above formula, R represents $C_nH_{2n+1}$ (n=4~10), $R_1$ and $R_2$ represent H or $Si(CH_3)_2OR$ which are the same or different.

In this time, the additive amount used in general formula (I) is different according to the amount of sunlight, but generally, it is 0.001~0.5% to the total amount, preferably it is 0.005~0.2%. Below 0.001% of additive amount of alkoxydimethylsilylferrocene, photolysis occurs late. However, even if photolysis occurs fast above 0.5% of the additive amount, economical efficiency is low, since using time of products, i. e., preserving time of products, is short, the color of film products occurs and the price is high. Thus, in considering these points, it was made to decompose after passing about 2 or 4 months.

In this invention, there is characteristic in adding alkoxydimethylsilylferrocene to polyolefin, and it is possible to suitably control the amount in considering the region.

Besides these components, heat stabilizer, Antioxidizer, slip agent, Antiblocking agent, filling substance, dyestuff, and other additives such as the incidental additives can be contained as like injection-forming products according to the demand of physical property for final products.

Also, there are various methods using photolytic agent, i.e., the method which directly input a certain amount in an extruder, the method which use after simply blending resin and photolytic agent with certain amount, and the master batch method which extrude and pelletize after blending with resin. The master batch can reaffirm the degree of dispersion in the measurement of amount with "Link" that is microanalyser of x-ray. In using masterbatch, desirably 1~10% of the concentration of active component is good and in operating masterbatch, it is most desirable to input about 2~5% to polyolefin.

The effect of photolysis of an additive was tested in the best state for film test piece in the irradiation of ultraviolet radiation. The test piece contained polypropylene.

The degree of photolysis of the composite was measured by measuring the extension ratio of rupture point after irradiating with artificial sunlight with zenon lamp XE 150-1 of zenon tester 150S. The time of photolysis means the time to the point that the extention ratio equals 0 from the rupture point when the test piece is broken.

The composite of polyolefin of this invention is used for the manufacture of a kind of film, a kind of sheet, a kind of filament, blown film, extruded products and injected products.

Also, the film is the film of monoaxially oriented or biaxially oriented, and is combined film coextruded or laminated. Furthermore, these layers may be made of the same polyolefin and they can be made of different kinds of polyolefin.

DESCRIPTION OF THE PREFERRED EMBODIMENTS

Example 1

After mixing isotactic polypropylene resin(melting point 165° C., melt flow index number 4.0) 9.99 kg(99.9 wt %) and AOSF which is photolytic agent 10 g(0.1 wt %) by using a high speed "Colin" mixer, they are input into the cast extrusion line for film that the ratio of screw length to diameter is 25, and then are produced by extrusion. In extruding temperature, barrel temperatures are to be the step of 190°, 200° and 230° C., respectively, cooling temperature is 25° C. and the film thickness is 30 µm.

The film manufactured by this way was measured by zenon tester which is a machine measuring weather resistance in order to measure the weather resistance. As a measuring condition, the test piece (width 10 mm) is steam-sprayed for 18 minutes every 2 hours at 60° C. and is taken at regular time interval and then the physical property of the film was measured by an universal tester with the speed of 10 mm per minute.

At this time, the decomposition time is decided as the point that the extention ratio becomes 0%.

The results of important physical property and photolytic time for the film of Example 1 were illustrated in Table 1.

Example 2 or Example 3

As like the above mentioned Example 1, the film was manufactured and tested by the same method of Example 1 except that photosensitizer AOSF 20 g (0.2%), 50 g (0.5%) are used to isotactic polyprophylene 9.98 kg (99.8%), 9.95 kg (99.5%), respectively.

The results of important physical property and photolytic time of the film were shown in Table 1.

Example 4

In order to improve the dispersion effect and work efficiency of product manufacture, masterbatch of photolytic agent was produced. First, after mixing isotactic polyprophylene powder (melting point 165° C., melt flow index number 4) 9.5 kg(95%) and photosensitizer AOSF 0.5 kg(5%) by using a mixer, they are extruded by twin screw extruder that the ratio of length to diameter is 25. The barrel temperatures of the extruder are 170°, 190° and 200° C., respectively. The strain coming from the extruder is cooled with cooling water, is dried and then is cut to 0.5×0.5 cm. The melt flow index number of masterbatch manufactured by this way is 4.9 g/10 min. By mixing 5% masterbatch 0.2 kg(2%) produced by this way and isotactic polyprophylene (melting point 165° C., melt flow index number 4) 9.8 kg(98%) with a mixer, the final concentration of photolytic agent was controlled to be 0.1% compared to weight. The mixed resin obtained by this way was manufactured to film and tested as like Example 1.

The results of important physical property and photolysis time were shown in Table 1.

Example 5 or Example 6

As like Example 4, the film was manufactured and tested except that the final concentrations in the film were controlled to be 0.2% end 0.5% by using 5% masterbatch manufactured by the above mentioned Example 4 0.4 kg(4%), 1.0 kg(10%) to isotactic polypropylene 9.6 kg(96%), 9.0 kg(90%), respectively.

The results of the important physical property and photolytic time of the film were shown in Table 1.

Comparative Example 1

The film was manufactured and tested by the same method of Example 1 except that only 10 kg(100%) of isotactic polypropylene which is the same with that of the above mentioned Example 1 was used.

The results of important physical property and photolytic time of the film were shown in Table 1.

Comparative Example 2

The film was manufactured and tested with the same method of Example 1 except that same amounts of FEP-2, 20 g, was used instead of AOSF used as photolytic agent in the above mentioned Example 2.

The results of important physical property and photolytic time of the film were shown in Table 1.

Comparative Example 3

The film was manufactured and tested as like Example 3 except that absorbent of ultraviolet radiation, CYASORB 531(CiBA GEIGY Company Products) 30 g (0.3%) was used to AOSF 20 g(0.2%) instead of AOSF 50 g (0.5%) used as the photosensitizer as the above mentioned Example 3.

The results of important physical property and photolytic time of the film were shown in Table 1.

Example 7

For the formation of central layer, as like the above mentioned Example 4, isotactic polypropylene resin 9.8 kg and masterbatch 0.2 kg(2 wt %) of 5% photolytic agent were extruded by the extruder that the ratio of screw length and diameter is 32. The barrel temperatures of the extruder are 180°, 190°, 200° and 230° C., respectively. In order to manufacture both surface layers coextruded to the sheet of the central layer, polypropylene ternary copolymer resin 1.6 kg in which ethylene, butene and prophylene were contained with 4%, 4% and 92%, respectively and 5% masterbatch 0.4 kg(2 wt %) were mixed and extruded by the extruder that the ratio of screw length to diameter is 25. At this time, tests were done as like Example 4 except that the barrel temperatures are to be 200°, 230°, 230° C., respectively.

The results of important physical property and test are shown in Table 2.

Example 8 or Example 9

The film was manufactured and tested as like the above mentioned Example 7 except that the final concentrations were controlled to be 0.2%, 0.5% respectively by using isotactic polypropylene 9.6 kg(96%), 9.0 kg(90%) and 5% masterbatch 0.4 kg(4%), 1.0 kg(10%) to the central layer, and ternary copolymer 1.2 kg, 1.0 kg and 5% masterbatch 0.8 kg, 1.0 kg were mixed to both surface layers, respectively.

The results of important physical property and test were shown in Table 2.

Comparative Example 4

As like the above mentioned Example 7, the film were manufactured and tested except that isotactic polypropylene 10 kg was used to the central layer and each 2 kg of ternary copolymer to both surface layers.

The results of important physical property and test were shown in Table 2.

Example 10

Final concentration of an additive in the products was controlled to be 0.1% by mixing 5% masterbatch 0.2 kg(2 wt %) to 9.8 kg (98 wt %) of the same kind of isotactic polypropylene and ternary copolymer with those in Example 7 which were mixed with the same amount. The compound prepared like this was extruded to a tube of fault structure through a die of round shape. This tube was heated until extension temperature after cooled with cooling water, and it was simultaneously extended 5 times to each perpendicular and horizontal direction of both layers. In the film manufactured like this, the final thickness is 15 μm.

Table 3 showed the value of important physical property and photolytic time of this film.

Example 11 or Example 12

The film was manufactured and tested as like the above mentioned Example 10 except that isotactic polypropylene and ternary copolymer of 9.6 kg(96 wt %), 9.0 kg(90 wt %) in which same amounts were mixed respectively and 5% masterbatch 0.4 kg(4 wt %), 1.0 kg(10 wt %) were mixed, and the final concentration of additive amount in the products was controlled to be 0.2%, 0.5%, respectively.

Table 3 shows the value of important physical property and photolytic time of the film.

Comparative Example 5

As like the above mentioned Example 10, the film was manufactured and tested by using only the sum of 10 kg (100 wt %) of isotactic polypropylene and ternary copolymer which are the same kind with those in the above mentioned Example 7.

Table 3 shows the value of important physical property and photolytic time of the film.

Example 13

By mixing isotactic polypropylene resin (melting point 165° C., melt flow index number 6 g/10 min) 9.8 kg and masterbatch 0.2 kg of 5% photolytic agent as like Example 10, the final amount of products is to be 0.1% and a cup of volume 200 ml, thickness 0.8 mm is extruded. This cup was exposed outdoor in the weather condition of Moscow from 15, February (−10° C.) to 16, April (4° C.).

The degree of photolysis of extrusion-forming products was shown in Table 4 as function of the concentration of photosensitizer and time.

Example 14

The cup was extruded and tested as like the above mentioned Example 13 except that, as like the above mentioned Example 1, masterbatch 0.4 kg of photolytic agent was mixed to isotactic polypropylene 9.6 kg, and the final concentration of the products was controlled to be 0.2%.

The degree of photolysis of extrusion-forming products as a function of the concentration of photosensitizer and time was shown in Table 4.

Comparative Example 6

As like the above mentioned Example 13, a cup was manufactured and tested except that a cup was extruded by using only 10 kg(100 wt %) of isotactic polypropylene which is the same as the above mentioned Example 13.

The degree of photolysis of extrusion-forming products as a function of the concentration of photosensitizer and time was shown in Table 4.

TABLE 1

Photolytic time in the experiments measuring important physical property and weather resistance as a function of the concentration of photosensitizer in no-extension polypropylene film (film thickness 30 μm)

| | | Example 1 | Example 2 | Example 3 | Example 4 | Example 5 | Example 6 | Comparative Example 1 | Comparative Example 2 | Comparative Example 3 |
|---|---|---|---|---|---|---|---|---|---|---|
| concentration of photosensitizer (wt %) | | 0.1% AOSF | 0.2% AOSF | 0.5% AOSF | 2% MB with 5% AOSF | 4% MB with 5% AOSF | 10% MB with 5% AOSF | 0% AOSF | 0.2% FEP-2 | 0.2% AOSF + 0.3% CYASORB |
| tensile strength (MPa) | MD | 96 | 103 | 93 | 100 | 82 | 101 | 90 | 82 | 101 |
| | TD | 46 | 51 | 42 | 51 | 43 | 40 | 46 | 25 | 40 |

TABLE 1-continued

Photolytic time in the experiments measuring important physical property and weather resistance as a function of the concentration of photosensitizer in no-extension polypropylene film (film thickness 30 μm)

|  |  | Example 1 | Example 2 | Example 3 | Example 4 | Example 5 | Example 6 | Comparative Example 1 | Comparative Example 2 | Comparative Example 3 |
|---|---|---|---|---|---|---|---|---|---|---|
| extension ratio (%) | MD | 450 | 460 | 440 | 470 | 400 | 430 | 450 | 400 | 430 |
|  | TD | 830 | 890 | 880 | 820 | 800 | 815 | 830 | 580 | 815 |
| Photolystic time (hr) |  | 240 | 190 | 190 | 220 | 185 | 180 | 550 | 280 | 550 |

*AOSF = ALKOXYDIMETHYLSILYLFERROCENE
*FEP-2 = 2,2-bis(1,1 diethylferrocenyle)propane
*CYASORB = CYASORB 531 (CIBA-GEIGY Company Products)
*MB = Masterbatch of photolytic agent
*MPa = Mega pascal
*MD = Machine Direction
*TD = Transverse Direction

TABLE 2

Important physical property and photolytic time as a function of the concentration of photosensitizer in no-extension polyprophylene film having coextrusion of three layers structure

|  |  | Example 7 | Example 8 | Example 9 | Comparative Example 4 |
|---|---|---|---|---|---|
| Concentration of photosensitizer (wt %) |  | 2% MB with 5% AOSF | 4% MB with 5% AOSF | 10% MB with 5% AOSF | 0% MB with 5% AOSF |
| Tensile strength (MPa) | MD | 90 | 93 | 95 | 92 |
|  | TD | 45 | 42 | 47 | 43 |
| Extension ratio (%) | MD | 500 | 520 | 525 | 515 |
|  | TD | 805 | 810 | 810 | 800 |
| Photolytic time (hr) |  | 200 | 185 | 180 | 530 |

TABLE 3

Important physical property and photolystic time as a function of the concentration of photosensitizer in extension polyprophylene film (film thickness 15 μm)

|  |  | Example 10 | Example 11 | Example 12 | Comparative Example 5 |
|---|---|---|---|---|---|
| Concentration of photosensitizer (wt %) |  | 2% MB with 5% AOSF | 4% MB with 5% AOSF | 10% MB with 5% AOSF | 0% MB with 5% AOSF |
| Tensile strength (MPa) | MD | 136 | 139 | 142 | 121 |
|  | TD | 137 | 153 | 152 | 147 |
| Extension ratio (%) | MD | 100 | 120 | 98 | 63 |
|  | TD | 102 | 129 | 111 | 109 |
| Photolytic time (hr) |  | 205 | 180 | 175 | 520 |

TABLE 4

Degree of photolysis of extrusion-forming products as a function of photosensitizer concentration (wt %) and time

|  |  | Example 13 | Example 14 | Comparative Example 6 |
|---|---|---|---|---|
| Concentration of photosensitizer (wt %) |  | 2% MB with 5% AOSF | 4% MB with 5% AOSF | 0% MB with 5% AOSF |
| Irradiation | 0 | Δ | Δ | Δ |
| time (month) | 1 | Δ | o | Δ |
|  | 2 | o | ⊙ | Δ |
| Degree of analysis |  | o | ⊙ | Δ |

⊙: Complete analysis
o: Analysis
Δ: Non analysis

What is claimed is:

1. A polyolefin composition which is photolyzable, comprising:
   polyolefin; and
   an effective amount of a photolytic agent which is an alkoxydimethylsilylferrocene having a general formula (I):

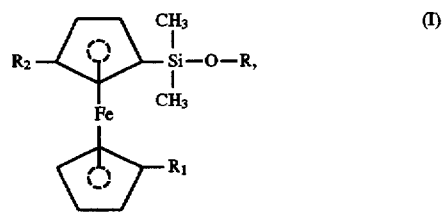

wherein R represents $C_nH_{2n+1}$ in which n ranges from 4 to 10, and $R_1$ and $R_2$ represent H or $SI(CH_3)_2OR$ and may be the same or different.

2. The polyolefin composition according to claim 1, wherein the polyolefin is selected from the group consisting essentially of a low density polyethylene, a high density polyethylene, a polypropylene, an ethylene-propylene copolymer, an ethylene-butene copolymer, an ethylene-hexene copolymer, an ethylene-octene copolymer, an ethylene-vinyl acetate copolymer, and mixtures thereof.

3. The polyolefin composition according to claim 1, wherein the alkoxydimethylsilylferrocene is present in an amount ranging from 0.001 weight % to 0.5 weight %.

4. The polyolefin composition of the claim 3, wherein the alkoxydimethylsilylferrocene is present in an amount ranging from 0.005 weight % to 0.2% weight %.

5. The polyolefin composition according to claim 1, wherein the alkoxydimethylsilylferrocene in liquid form is premixed with a portion of the polyolefin to provide a masterbatch which is concentrated.

6. The polyolefin composition according to claim 5, wherein the alkoxydimethylsilylferrocene is present in the masterbatch in an amount ranging from 2 weight % to 5 weight %.

7. The polyolefin composition according to claim 6, wherein the masterbatch is added to a remaining portion of the polyolefin in an amount ranging from 1 weight % to 10 weight %.

8. The polyolefin composition according to claim 5, wherein the masterbatch is added to a remaining portion of the polyolefin in an amount ranging from 1 weight % to 10 weight %.

9. A polyolefin film, which is comprised of the polyolefin composition according to claim 1, which is one of (a) non-oriented, (b) monoaxially oriented, or (c) biaxially oriented, and which has a form of a film.

10. The polyolefin film according to claim 9, wherein the polyolefin film is one of a coextruded film or a laminated film.

11. A polyolefin sheet which is comprised of the polyolefin composition according to claim 1, and which has a form of a sheet.

12. A polyolefin filament which is comprised of the polyolefin composition according to claim 1, and which has a form of a filament.

* * * * *